US011450054B2

(12) United States Patent
Choi et al.

(10) Patent No.: US 11,450,054 B2
(45) Date of Patent: Sep. 20, 2022

(54) METHOD FOR OPERATING A CHARACTER RIG IN AN IMAGE-GENERATION SYSTEM USING CONSTRAINTS ON REFERENCE NODES

(71) Applicant: Unity Technologies SF, San Francisco, CA (US)

(72) Inventors: Byung Kuk Choi, Wellington (NZ); Albrecht Steinmetz, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

(21) Appl. No.: 17/239,381

(22) Filed: Apr. 23, 2021

(65) Prior Publication Data

US 2022/0108512 A1 Apr. 7, 2022

Related U.S. Application Data

(60) Provisional application No. 63/086,541, filed on Oct. 1, 2020.

(51) Int. Cl.
*G06T 13/40* (2011.01)
(52) U.S. Cl.
CPC .................................. *G06T 13/40* (2013.01)

(58) Field of Classification Search
None
See application file for complete search history.

(56) References Cited

U.S. PATENT DOCUMENTS

2018/0158198 A1* 6/2018 Karnad ..................... G06T 7/12

* cited by examiner

*Primary Examiner* — Vu Nguyen
(74) *Attorney, Agent, or Firm* — Haynes and Boone, LLP

(57) ABSTRACT

A character rig may be representable as a data structure specifying a plurality of articulated character parts, an element tree specifying relations between character parts, and a set of constraints on the character parts. After receiving rotoscoping movement input data corresponding to attempted alignments of movements of at least some of the character parts with elements moving in a captured live action scene, a rotoscoping constraints may be received. The rotoscoping constraint may include at least a first constraint on the character rig other than a second constraint specified by the data structure of the character rig, Thereafter, rig movement inputs for a second set of character parts distinct from the first set of character parts may be accepted and the character rig may be moved according to the rig movement inputs while constrained by the rotoscoping constraints.

24 Claims, 7 Drawing Sheets

METHOD FOR OPERATING A CHARACTER RIG IN AN IMAGE-GENERATION SYSTEM USING CONSTRAINTS ON REFERENCE NODES

CROSS-REFERENCES TO PRIORITY AND RELATED APPLICATIONS

This application claims the benefit of, and priority from, U.S. Provisional Patent Application No. 63/086,541 filed Oct. 1, 2020, entitled "Method for Operating a Character Rig in an Animation System Using Constraints on Reference Nodes."

The entire disclosure of the application recited above is hereby incorporated by reference, as if set forth in full in this document, for all purposes.

FIELD

The present disclosure generally relates to computer image generation for animation and other purposes and tools for operating character rigs used for positioning characters and more particularly to controls and processes for controlling parts of a character rig during placement of the character rig based on rotoscoping images.

BACKGROUND

In computer-generated image manipulation, of images and/or video sequences, there might be a desire to remove an object (a character, an inanimate object, an animal, etc.) from one imagery and insert it into another. To do so in a pleasing manner, typically a boundary of the moved object is determined and the portions of an image within that boundary defines which pixels of an image are moved. For example, a fencer can be filmed performing a routine within an arbitrary setting and a resulting video sequence can be edited to remove the fencer from that video and insert the fencer performing in front of a different background. Where the original filming is done in front of a background of uniform color, i.e., chroma keying, the determination of the boundary between what is to be moved to the new video (the fencer) and what is to remain (the background) moving imagery can be relatively easily automatically determined. Where such a background was not used, defining the boundary could be more difficult.

One approach to determining the boundary is rotoscoping, wherein an animator or other artist traces over elements in frames of video, frame by frame, to produce definitions of the boundary. Once that boundary is known to an image processing system, it can generate a matte video sequence, showing a silhouette over time of what is the bounded object and what is not. In tracing an object or objects, and thus defining the boundaries, an image processing system can move the objects from one scene and insert them in another, and this has utility for computer-generated image generation. In addition to moving objects, outlines might be generated over the objects at the defined boundaries.

Another task that might be done manually, with computer assistance, by an animator or artist, often referred to as a rotoscoping artist, or roto artist, is to model a three-dimensional (3D) character rig of a character and the animation of the 3D character rig so that the character moves in a 3D virtual space in coincidence with movement of the boundary of the objects in the video sequence. In one example, a 3D character of a fanciful being is animated so that on screen its boundaries conform to boundaries of an object, such as a live actor, in captured live action video and thus the live actor can be replaced by the fanciful being in the video.

The character rig can represent a person, character, an object, or the like. A rotoscoping image may correspond to a two-dimensional (2D) image of a scene, such as a frame within a video or animation. The scene may include one or more objects, including people, animals, items, background scenery, and other visual objects. The roto artist may use a computer system to view the 2D scene of the rotoscoping image and may wish to model, animate, or position a 3D character rig to correspond to an object within the 2D scene.

Positioning a 3D character rig might require quite a bit of adjusting on the part of the roto artist to get a desirable effect and improved user interface and animation tools might be desired.

SUMMARY

According to some embodiments, a computer-implemented method for positioning a character rig in an animation system may include, under the control of one or more computer systems configured with executable instructions, obtaining the character rig, receiving rotoscoping movement input data, and receiving rotoscoping constraints. The character rig may be representable as a data structure specifying a plurality of articulated character parts, an element tree specifying relations between character parts, and a set of constraints on the character parts. The rotoscoping movement input data may correspond to attempted alignments of movements of at least some of the character parts with captured elements in a captured live action scene. The rotoscoping constraint may include at least a first constraint on the character rig other than a second constraint specified by the data structure of the character rig.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
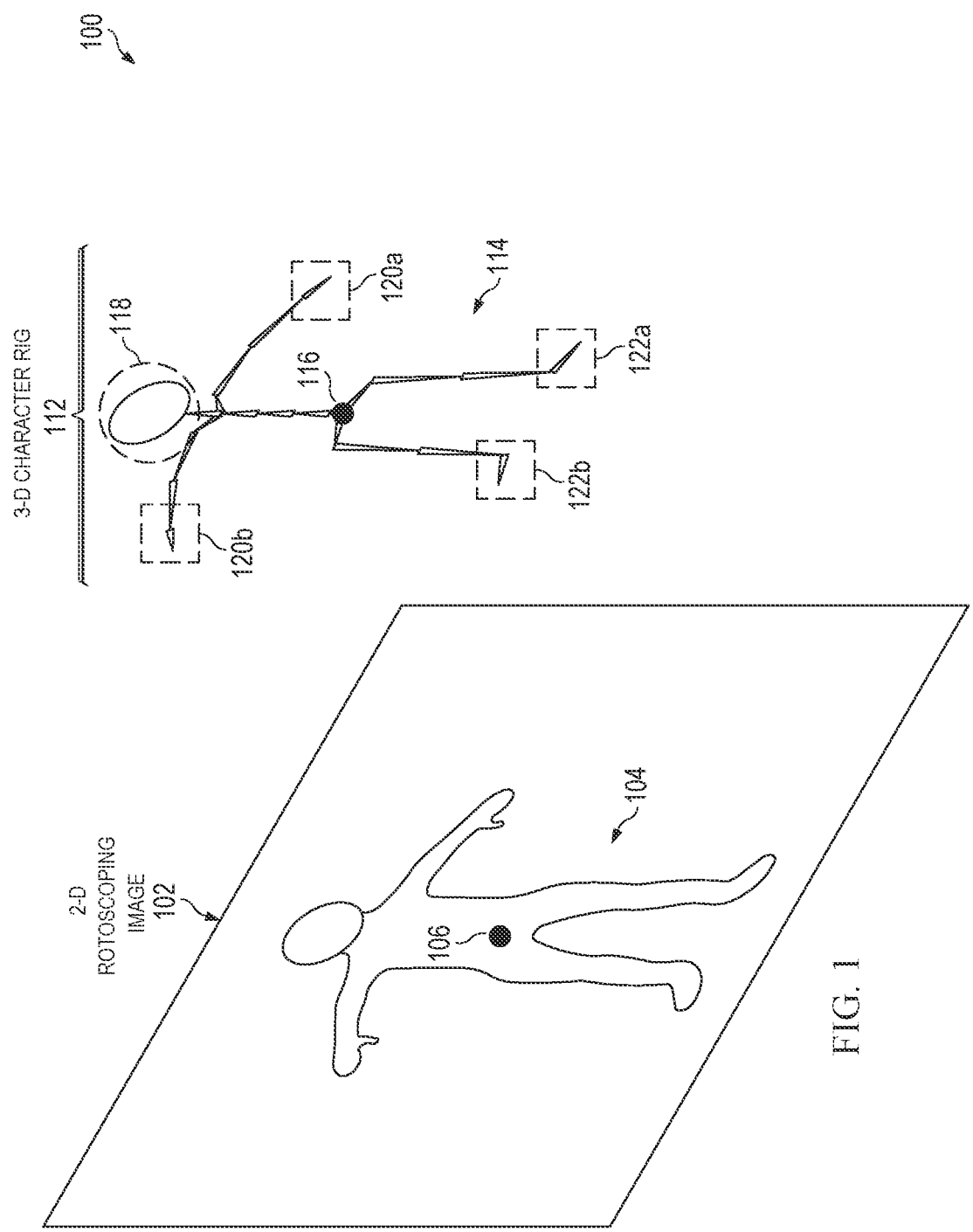
FIG. 1 illustrates an environment where a rotoscoping artist (roto artist) may modify a three-dimensional (3D) character rig to align with a two-dimensional (2D) rotoscoping image, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A rotoscoping operation might involve a roto artist using a computer system to specify boundaries of objects in images and/or video frames. Another operation might involve placing a 3D character rig of a character into a virtual space and animate the character to align with where boundaries would be of objects in a 2D image. Where the 3D character rig has a many articulated parts, it might be difficult to get the 3D character rig to align, as moving some parts of the rig might cause other parts to have to be adjusted. One reason for this is that a 3D character rig specifies constraints on the rig, such as the constraint that a hand must remain attached to a wrist, the wrist must remain attached to a forearm, and the length of the forearm must remain within a narrow range of lengths.

A roto artist may position the 3D character rig to align with an object. However, a 3D character rig may include multiple character parts, including hands, arms, legs, feet, a head, and the like, where each character part may be connected to one or more other character parts. Thus, when a first character part is moved, a corresponding effect may occur with one or more second character parts, such as by moving those character parts in unison with the first character part. Movement of the 3D character rig and rotoscoping may be done part-by-part where each body part of a character rig is moved individual on this basis when viewed in a user interface of a computing system. This can cause unintended animation effects when the roto artist configures the 3D character rig via the user interface, which may adversely affect animations.

In some animation tasks, a 3D character rig is placed into a 3D virtual space by first positioning a root node of the rig in the virtual space through a user interface of a computing system, then positioning child nodes as desired, then positioning the next branches of a node tree defined by the rig. Within the three-dimensional (3D) character rig, a base or root node may be specified for a data structure of the 3D character rig, which is then related to the other character parts through an element tree. The element tree designates the relations and connections between the different character parts (e.g., a hierarchy of the connections between character parts). The data structure of the 3D character rig further may include a set of constraints that designate the movement, degrees of freedom, orientation, and the like of each character part and/or nodes, for example, with respect to other character parts. The constraints are often "baked into" the rig by a creature artist tasked with creating rigs for real or fanciful characters, and rig creating might require different skill sets from the roto artists who might use those rigs.

In further embodiments, the 3D character rig may also include mass or weight data for the character parts, which may further designate forces applied to various character parts when moved. The 3D character rig may be animated through both forward and inverse kinematics. In forward kinematics, an animation of the 3D character rig causes the character parts of the model at a specified time to be determined from the forces applied to the character parts, including joints and other connections as specified by the element tree and the constraints. Conversely, through inverse kinematics, the orientation of the character parts is determined and calculated from the desired position of certain character parts and their corresponding joints and other connections. Thus, when a character part is moved by the roto artist, a corresponding effect may occur elsewhere in the 3D character rig.

In a specific example, a two-dimensional (2D) rotoscoping image may include a human or other character (e.g., an animal), where a 3D character rig may correspond to an animated model that the roto artist may move and manipulate to align with and/or mirror the position, orientation, and/or movement of the character from the rotoscoping image. When aligning the 3D character rig with the character in the rotoscoping image, the roto artist may be satisfied that one or more character parts in the 3D character rig is properly aligned with the character from the rotoscoping image. For example, during part-by-part rotoscoping of individual body parts, a particular body part may be placed according to the corresponding rotoscoping image. Thus, the roto artist may be satisfied with a particular part-by-part placement but may then wish to move a different body part to align with the rotoscoping image when viewing a user interface associated with the 2D rotoscoping image and 3D character rig in a computing system.

The roto artist may then designate the character parts or other nodes for locking and constraining into their positions. This may prevent movement of the character parts that may be caused due to the element tree(s) and set of constraint(s) for the underlying data structure of the 3D character rig. Additionally, constraining another character part may designate the character part as a root node for relations to other character parts through the element tree, which may be constrained by the corresponding constraints on the character parts. When performing part-by-part rotoscoping, this allows for placement of a particular body part in a desired position (e.g., based on a rotoscoping image), where the body part may then be constrained to the desired position. Thereafter, additional body parts may be moved by the roto artist on a part-by-part basis in order to place additional body parts in positions according to one or more rotoscoping images, as viewed through a user interface of a computing system.

FIG. 1 illustrates an environment 100 where a roto artist may modify a 3D character rig to align with a 2D rotoscoping image, in an embodiment. As illustrated there, environment 100 may be displayed by a user interface of a computing device and computing display when positioning a 3D character rig or model for animation. For example, a character rig may correspond to a digital puppet and/or skeleton driven animation rig that allows for positioning of 3D characters utilizing rotoscoping images. Rotoscoping images may correspond to any 2D images by which an animator may overlay as a scene so that the 3D character rig may be moved and controlled to mimic the positions, motions, and movements of the rotoscoping images. For example, rotoscoping images may correspond to video or animation, generally in 2D, which is viewed by a roto artist. The roto artist then moves the appendages, limbs, and other body parts to imitate the person or object within the rotoscoping images. An exemplary rotoscoping image may be that of a person walking, where a character rig is then moved to line up with the person within the rotoscoping image. In environment 100, a 2D rotoscoping image 102 is shown with a rotoscoping character 104 in a position. In 2D rotoscoping image 102, rotoscoping character 104 may also have a center 106, which may correspond to a core of a body (e.g., stomach, chest, pelvis, or the like).

However, and as noted above, character rigs have multiple character parts, each of when are related through an element tree (e.g., forearm-hand-fingers). Further, these character parts and their relationships in the element tree are further constrained by a set of constraints on the character parts, including their movement, degrees of freedom, orientation to each other character part, and the like. In particular, and as shown in environment 100, a 3D character rig 112 is shown for a 3D character 114 that includes a root node 116 at a center area of 3D character rig 112, although other root nodes may also be placed elsewhere in other character rigs. 3D character rig 112 further includes a head 118, two hands corresponding to a hand 120a and a hand 120b, and two feet corresponding to a foot 122a and a foot 122b. However, it is understood other character rigs may be more or less complex and include more or less character parts, element trees, and/or constraints as defined by a creator of the character rig, such as a creature artist. The data structure for 3D character rig 112 may further specify mass data for character parts, such as a particular mass assigned to each character part (e.g., head 118, hands 220a-b, and/or feet 222a-b). Thus, when performing movements of 3D character rig 112, force data may also be utilized to specific simulated forces applied to character parts, which may further consider the particular masses of each character part.

In environment 100, the roto artist may initially move one or more character parts into a particular position. For example, controllers, actuators, and/or selections of particular body parts may allow the roto artist to configure 3D character 114 of 3D character rig 112 to match or mimic rotoscoping character 104 in 2D rotoscoping image 102. This may include positioning 3D character 114 into a silhouette of rotoscoping character 104 through the use of the controllers and features provided with 3D character rig 112. When moving 3D character rig 112, movements to one or more first character parts may cause an effect on one or more second character parts. This may be caused by the interrelationships between the character parts as defined by the element tree(s) and constraint(s) of the data structure for 3D character rig 112. For example, moving root node 116 may cause a movement in head 118, hands 120a-b, and/or feet 122a-b. In certain embodiments, this may cause adverse effects when attempting to have 3D character rig 112 mirror the position or movement of 2D rotoscoping image 102, and therefore may be undesirable. In this regard, the roto artist may wish to lock head 118 and constrain movement of head 118 when moving root node 116, hands 120a-b, and/or feet 122a-b. This may occur when the roto artist places head 118 in a correct position but may wish to move one or more of the other character parts within 3D character rig 112. Without constraining head 118, moving one or more of the other character parts may therefore cause head 118 to move due to data structure of 3D character rig 112.

Figure 2:
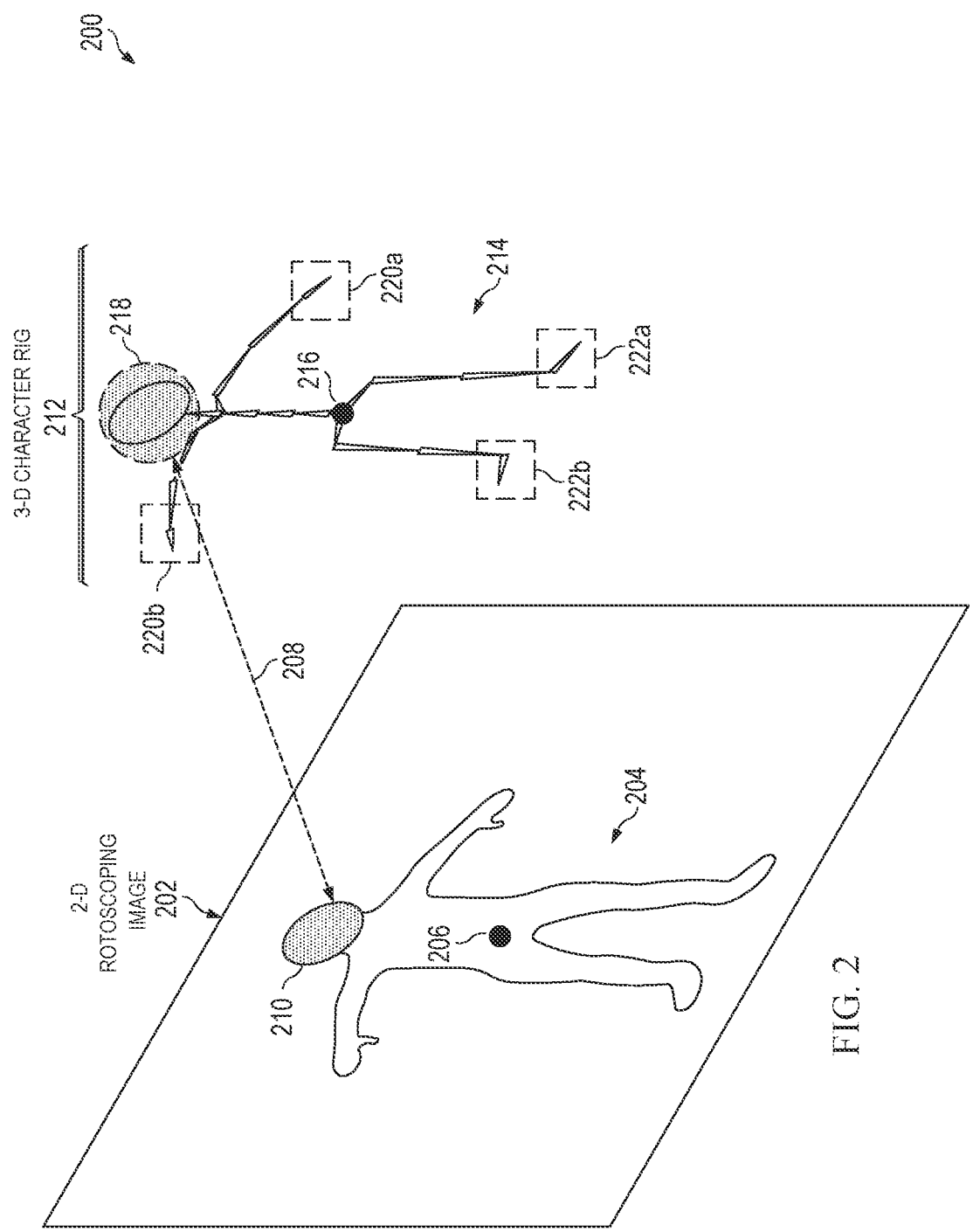
FIG. 2 illustrates an environment where a roto artist may constrain a first character part of a 3D character rig when moving one or more second character parts, in an embodiment.

FIG. 2 illustrates an environment 200 where a roto artist may constrain a first character part of a 3D character rig when moving one or more second character parts, in an embodiment. In environment 200 of FIG. 2, a roto art may view a 2D rotoscoping image 202 having a rotoscoping character 204 in a first position, orientation, and/or movement, such as a person or object within an image or video. The roto artist may view 2D rotoscoping image 202 through a user interface of a computing system and display, which may provide processes to align 3D character rig 212 with rotoscoping character 204 in 2D rotoscoping image 202. Thereafter, the roto artist may provide rotoscoping movement input data to 3D character rig 212, which configures 3D character rig 212 into a same or similar position, orientation, and/or movement corresponding to rotoscoping character 204 in 2D rotoscoping image 202.

The rotoscoping movement input data may correspond to movements for attempted alignments of 3D character rig 212 to correspond to rotoscoping character 204, such as those movements to align one or more character parts of 3D character rig 212 with the elements of rotoscoping character 204. 3D character rig 212 therefore corresponds to a 3D character 214 and includes a data structure having multiple character parts and a root node 216 used to provide relations between the character parts. The character parts for 3D character rig 212 include a head 218, two hands corresponding to a hand 220a and a hand 220b, and two feet corresponding to a foot 222a and a foot 222b. These character parts therefore show individual elements of 3D character 214. The data structure for 3D character rig 212 further includes an element tree that specifies the relations between the character parts, as well as a set of constraints that correspond to each character part's movement, degrees of freedom, orientation to each other character part, and the like in 3D character rig 212.

When providing the rotoscoping movement input data, the element tree and set of constraints may be used with one or more controllers, actuators, and/or selectable elements to move the character parts of 3D character rig 212 in unison and based on the interrelations between the individual character parts. For example, the roto artist may attempt to align a center 206 of rotoscoping character 204 with root node 216 shown on a center (e.g., stomach, chest, or pelvis) 3D character 214. However, moving a hand in a specific manner may cause a corresponding movement of a wrist, forearm, elbow, upper arm, shoulder, and the like. Thus, the roto artist may wish to lock or otherwise constrain one or more character parts in order to prevent additional movement of the character part(s) when moving elements of 3D character rig 212.

In this regard, the roto artist may be satisfied that an alignment 208 of head 218 is proper aligned with rotoscoping character head 210 in 2D rotoscoping image 202. The roto art may then place one or more rotoscoping constraints on head 218 so that head 218 is locked and constrained when utilizing controllers of 3D character rig 212 to move 3D character rig. The rotoscoping constraint(s) may correspond to one or more constraints on 3D character rig 212 that are separate from one or more constraints specified by the data structure of 3D character rig 212. Once the rotoscoping constraint(s) are applied, head 218 may be constrained in a particular alignment, orientation, and/or position in the 3D environment for 3D character rig 212. This may be shown in environment 200 as a red outline or highlighting of head 218 that indicates to the roto artist that head 218 is now constrained. This may also indicate that the roto artist has selected head 218 as a root node for purposes of moving other related character parts. Further, the roto artist may view alignment 208 showing the relationship between rotoscoping character head 210 of rotoscoping character 204 with head 218 of 3D character rig 212.

Thereafter, the roto artist may further use controllers, actuators, and/or selections of other character parts to provide additional movement inputs and data, where the other character parts are distinct from head 218. For example, the roto artist may attempt to move hands 220a-b. 3D character rig 212 may then be moved according to these other movement inputs, while head 218 remains constrained and/or locked in the particular position. These movement inputs may further align 3D character 214 with rotoscoping character 204. Further, the movement inputs may be performed over multiple frames, such as when 2D rotoscoping image 202 is one frame of a video or animation having multiple frames. The movement data for other character parts may be performed with those other character parts in relation to root node 216, as well as while head 218 is constrained. Thereafter, movements of nodes (e.g., character parts) lower in the element tree may be moved relative to root node 216 while maintaining head 218 in the constrained position.

Figure 3:
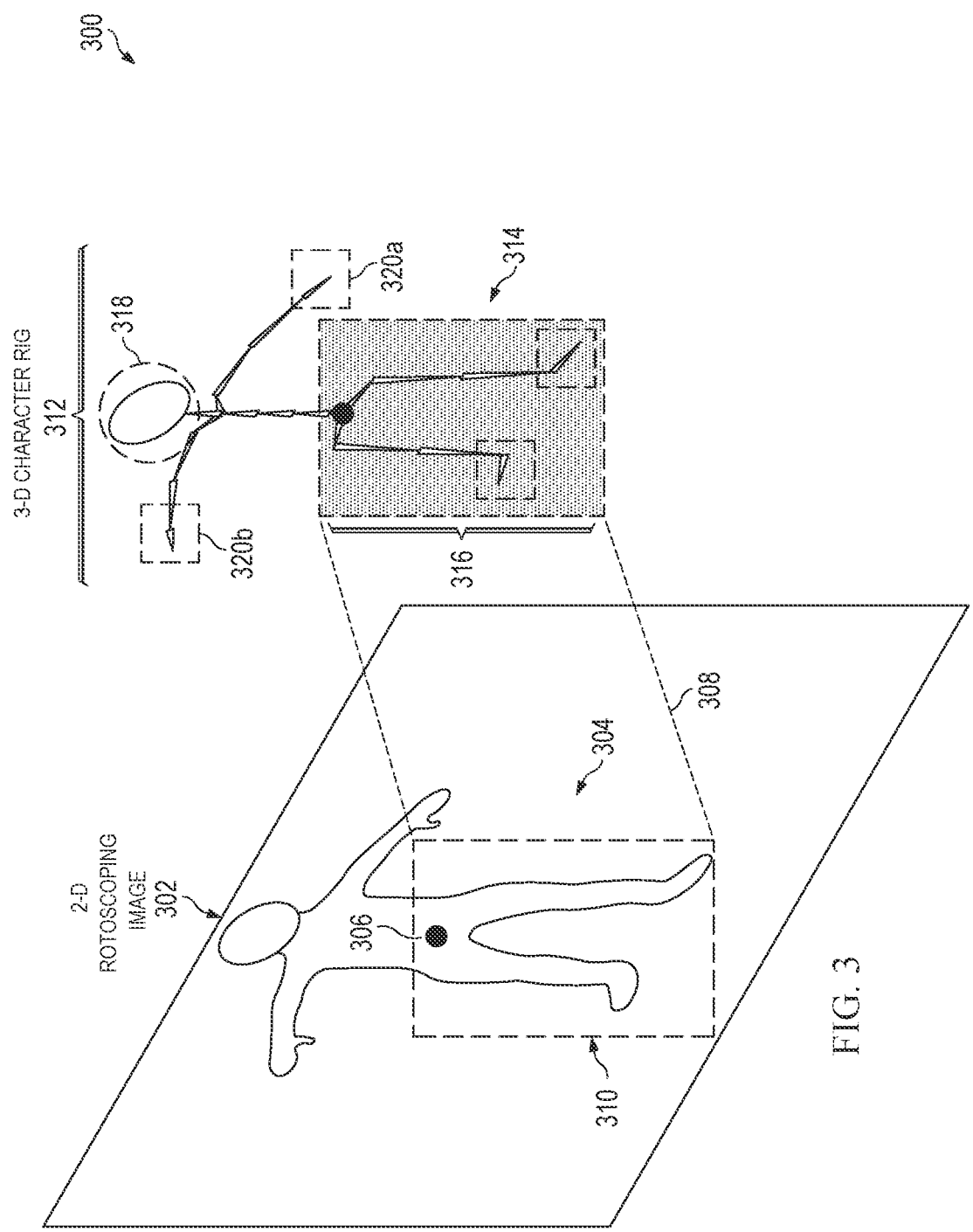
FIG. 3 illustrates an environment where a roto artist may constrain multiple related character parts in an element tree of a 3D character rig when moving one or more other character parts, in an embodiment.

FIG. 3 illustrates an environment 300 where a roto artist may constrain multiple related character parts in an element tree of a 3D character rig when moving one or more other character parts, in an embodiment. Similar to FIG. 2, in environment 300 of FIG. 3, a roto art may view a 2D rotoscoping image 302 having a rotoscoping character 304 in a first position, orientation, and/or movement, such as a person or object within an image or video. The roto artist may view 2D rotoscoping image 302 through a user interface of a computing system and display, which may provide processes to align 3D character rig 312 with rotoscoping character 304 in 2D rotoscoping image 302. Therefore, the roto artist may provide rotoscoping movement input data to 3D character rig 312 such that one or more character parts of 3D character rig 312 are aligned with rotoscoping character 304 in 2D rotoscoping image 302. Using the rotoscoping movement input data, the roto artist may be satisfied that a position of one or more body parts of a 3D character 314 is positioned similarly to rotoscoping character 304.

In environment 300, a lower body 316 of 3D character rig 312 may be substantially aligned with a center 306 and lower body 310 of rotoscoping character 304. Thus, an alignment 308 shows that lower body 316 of 3D character 314 is in a position, orientation, and/or movement corresponding to lower body 310 of rotoscoping character 304. The roto artist may then specify one or more rotoscoping constraints on lower body 316 to restrict and/or lock movement of lower body 316 when other character parts of 3D character rig 312 are moved. These constraints may therefore limit movement, degrees of freedom, orientation of lower body 316 when other portions of 3D character rig 312 are moved. For example, the rotoscoping constraints may prevent movement of lower body 316 that may be caused by the element tree(s) and/or set of constraints imposed on the data structure corresponding to 3D character rig 312. This may be applied by selecting, highlighting, or otherwise providing input to 3D character rig 312 that indicates lower body 316 has been constrained (e.g., by providing an output indicator, such as red outlining or highlighting of the character parts in lower body 316).

Thereafter, the roto artist may further use controllers, actuators, and/or selections of other character parts to provide additional movement inputs and data, where the other character parts are distinct from lower body 316. For example, the roto artist may also provide additional movement inputs to head 318. In further embodiments, the roto artist may attempt to move a hand 320a or a hand 320b. 3D character rig 312 may then be moved according to these other movement inputs, while lower body 316 remains constrained and/or locked in the particular position. In this regard, the element tree and/or set of constraints corresponding to the data structure of 3D character rig 312 may normally define additional movements to lower body 316, such as based on a root node, legs, feet, or the like within lower body 316. However, by constraining lower body 316, such additional movements may not be affected on the character parts of lower body 316. The roto artist may therefore move head 318 or hands 320a-b without causing unintended movements to lower body 316. This allows the roto artist to further align 3D character 314 with rotoscoping character 304. This may also include establishing lower body 316 as a root node so that movements of nodes (e.g., character parts) lower in the element tree may be moved relative to the various root nodes while maintaining lower body 316 in the constrained position. Further, the movement inputs may be performed over multiple frames, such as when 2D rotoscoping image 302 is a frame of a video or animation.

Figure 4:
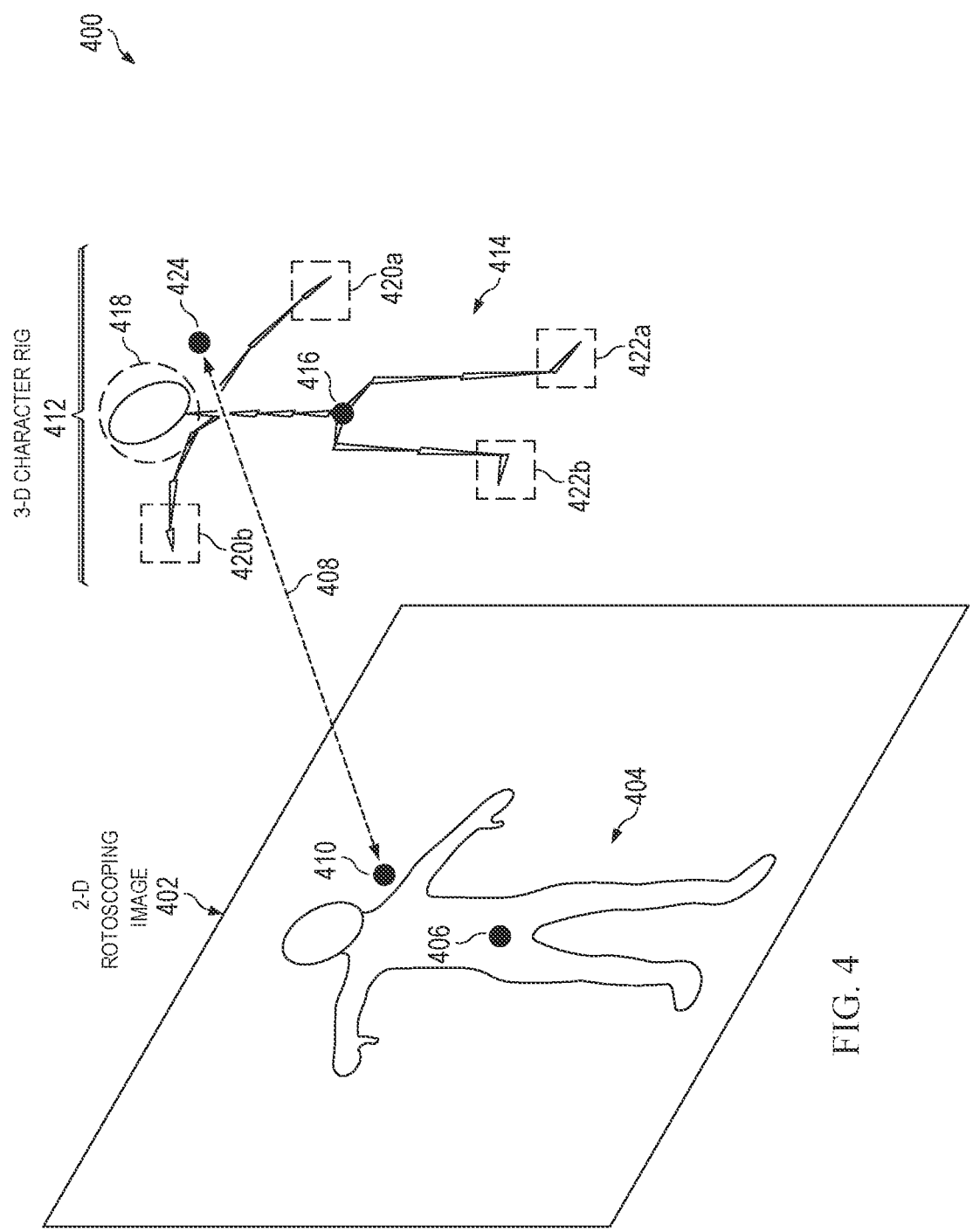
FIG. 4 illustrates an environment where a roto artist may place a marker to constrain one or more first character parts of a 3D character rig when moving one or more second character parts, in an embodiment.

FIG. 4 illustrates an environment 400 where a roto artist may place a marker to constrain one or more first character parts of a 3D character rig when moving one or more second character parts, in an embodiment. Similar to FIGS. 2 and 3, in environment 400 of FIG. 4, a roto art may view a 2D rotoscoping image 402 having a rotoscoping character 404 in a first position, orientation, and/or movement, such as a person or object within an image or video. The roto artist may view 2D rotoscoping image 402 through a user interface of a computing system and display, which may provide processes to align 3D character rig 412 with rotoscoping character 404 in 2D rotoscoping image 402. Therefore, the roto artist may provide rotoscoping movement input data to 3D character rig 412 such that one or more character parts of 3D character rig 412 is aligned with rotoscoping character 404 (e.g., a center 406 of rotoscoping character 404 may be aligned with a root node 416 for 3D character 414).

In this regard, 2D rotoscoping image 402 may include a further object, point, or location of importance to the roto artist, shown as point of interest 410. For example, rotoscoping character 404 may be focused on point of interest 410, moving towards point of interest 410, or otherwise be associated with point of interest 410. Therefore, the roto artist may provide the rotoscoping movement input data to orient or move 3D character rig 412 with respect to point of interest 410. The roto artist may be satisfied that a position of one or more body parts of a 3D character 414 is aligned to mimic or mirror rotoscoping character 404 in 2D rotoscoping image 402 based on point of interest 410. In environment 400, the roto artist may designate a marker 424 in the 3D space and/or environment for 3D character rig 412 that corresponds to point of interest 410. An alignment 408 shows marker 424 in the 3D environment for 3D character rig 412 aligned with point of interest 410 from 2D rotoscoping image 402.

The roto artist may then specify one or more rotoscoping constraints for marker 424 that constrains movements of character parts for 3D character rig 412 based on marker 424. These constraints may therefore limit movement, degrees of freedom, and/or orientation of one or more character parts of 3D character rig 412 when other portions of 3D character rig 312 are moved. For example, the rotoscoping constraints may prevent or limit movement of a root node 416, a head 418, a hand 420a, a hand 420b, a foot 422a and/or a foot 422b of 3D character rig 412 with respect to marker 424, such as when another one of such character parts are moved. In order to constrain movements of 3D character rig 412 using marker 424, marker 424 may be extrapolated to a point on or within 3D character rig 412. For example, a placement on a surface, skin, muscle, or bone for 3D character 414 may be correlated to marker 424. Thereafter, this point may be used with the rotoscoping constraint to provide constraints to the character parts of 3D character rig 412.

The roto artist may further use controllers, actuators, and/or selections of other character parts to provide additional movement inputs and data to the various character parts of 3D character rig 412. For example, the roto artist may also provide additional movement inputs to head 418, or another character part. 3D character rig 412 may then be moved according to these other movement inputs, while the rotoscoping constraint resulting from marker 424 prevents or limits certain movements of 3D character rig 412. The element tree and/or set of constraints corresponding to the data structure of 3D character rig 412 may normally define additional movements to 3D character rig 412 when certain character parts are moved, such as based on a root node, legs, feet, or the like. However, by constraining 3D character rig at one or more points based on marker 424, certain other body parts may not react or may react in a more limited manner based on the corresponding rotoscoping constraint. The roto artist may therefore move head 418 or hands 420a-b without causing unintended movements to another portion of 3D character rig 412 constrained due to marker 424. This may allow the roto artist to further align 3D character 414 with rotoscoping character 404. Further, the movement inputs may be performed over multiple frames, such as when 2D rotoscoping image 402 is a frame of a video or animation.

In various embodiments, when viewing environments 100, 200, 300, and/or 400 via a user interface of a computing system and display, a roto artist may provide part-by-part rotoscoping of a 3D character rig through constraints applied to the 3D character rig. For example, a first body part, such as a left hand or arm, may be placed into a first position by the roto artist, and thereafter be constrained to remain in the position as described herein. Thereafter, additional part-by-part position and rotoscoping may be performed by then moving a second body part, such as a right hand or arm, which may be done without affecting the placement of the first body part. This allows for part-by-part rotoscoping based on the desired positioning of the 3D character rig, for example, using one or more 2D rotoscoping images.

Figure 5:
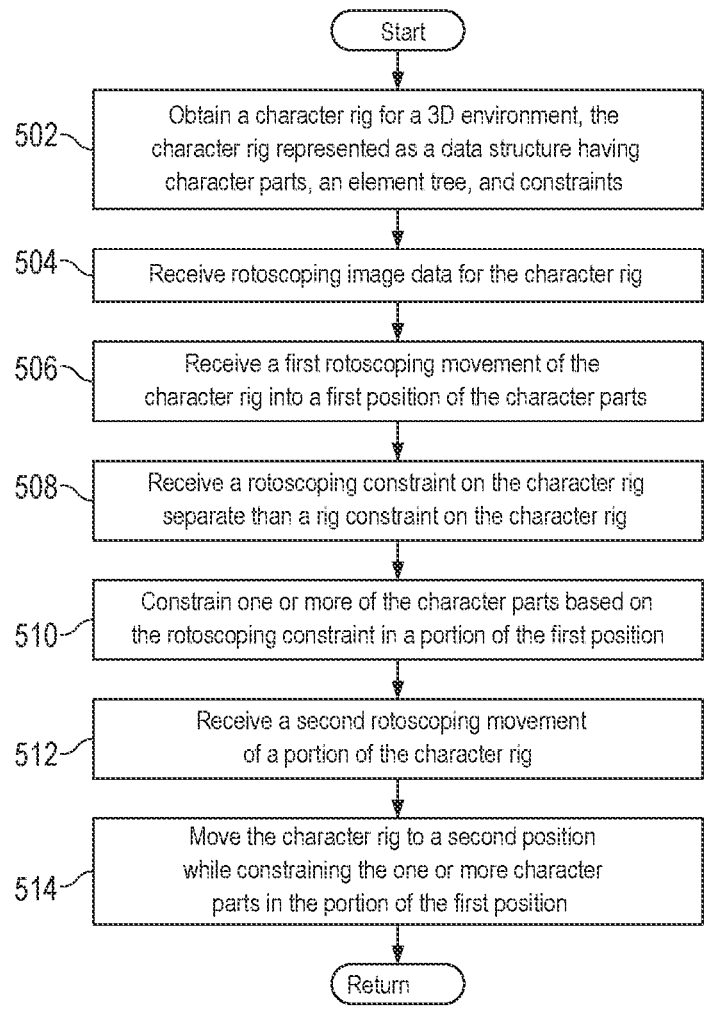
FIG. 5 is a flowchart of an exemplary method as might be performed by computing system when modeling a 3D character rig using 2D rotoscoping images, in an embodiment.

FIG. 5 is a flowchart 500 of an exemplary method as might be performed by computing system when modeling a 3D character rig using 2D rotoscoping images, in an embodiment. In step 502 of flowchart 500, a character rig for a 3D environment is obtained, where the character rig is represented as a data structure having character parts, an element tree, and constraints. The character rig may be represented in a 3D environment in order to position the corresponding 3D character for animation. At step 504, rotoscoping image data for the character rig is received. The rotoscoping image data may correspond to one or more 2D images, such as frames within a movie, video, or animation. Further, the rotoscoping image data may further include one or more objects that are used to align, move, and orient the character rig. At step 506, a first rotoscoping movement of the character rig into a first position of the character parts is received. This may include aligning or otherwise adjust the character rig by moving controllers for the character parts into a position or movement that mimics an object within the rotoscoping image data (e.g., a person or character). Thus, the alignment of the character rig and the rotoscoping image data may be received from a roto artist.

At step 508, after alignment of one or more character parts to the rotoscoping image data is performed, a rotoscoping constraint on the character rig that is separate than a rig constraint on the character rig is received. The rotoscoping constraint may limit, lock in place, or otherwise constrain one or more character parts from movement when one or more different character parts are moved. Thus, the rotoscoping constraint limits additional movement caused by the element tree(s), rig constraint(s), mass(es), and the like that affect the character parts in the data structure for the character rig. At step 510, based on this rotoscoping constraint, one or more of the character parts are constrained in a portion of the first position. This may include limiting or restricting one or more character parts (e.g., hands, head, torso, feet, and the like) into the position resulting from where the roto artist moved the character part(s) at step 506. Therefore, the character part(s) that may be aligned to the rotoscoping image may be constrained into their particular position(s).

At step 512, once the rotoscoping constraint is used to constrain movement of one or more character parts, a second rotoscoping movement of a portion of the character rig is received. For example, the roto artist may provide additional movement data to the controllers of the character rig. This includes moving another character part or section of character parts (e.g., upper body) in order to align with the rotoscoping image or otherwise configure the character rig. Since the rotoscoping constraint has been placed on the character part(s), at step 514, the character rig is moved to a second position while the one or more character part(s) that have been constrained remain in the corresponding portion of the first position. For example, where a head has been constrained and arms and/or shoulders are moved to a second position, the head may remain constrained in the location and portion of the first position. This allows for independent movement of the character parts with respect to the element tree(s) and/or rig constraints of the underlying data structure from the character rig.

The visual content generation system 600 (see FIG. 6) is configured to receive the rotoscoping images corresponding to 2D rotoscoping images such as 2D rotoscoping images 102, 202, 302, and 402 as input and output one or more static images and/or one or more modeling animations corresponding to 3D character rigs 112, 212, 312, and 412. The static image(s) and/or the animated video(s) include one or more visual representations of a rotoscoping image and a corresponding character rig modeled after the rotoscoping image, such as those found in environments 100, 200, 300, and 500. Further, 2D rotoscoping images 102, 202, 302, and 402 and 3D character rigs 112, 212, 312, and 412 may be provided to the animation creation system 630 (see FIGS. 1 and 6) or component of the visual content generation system 600 (see FIG. 6), which outputs 2D rotoscoping images 102, 202, 302, and 402 and 3D character rigs 112, 212, 312, and 412 within a display for animating 3D character rigs 112, 212, 312, and 412. This includes animating using constraints on one or more character parts, markers, or other nodes placed by the corresponding roto artist.

Figure 6:
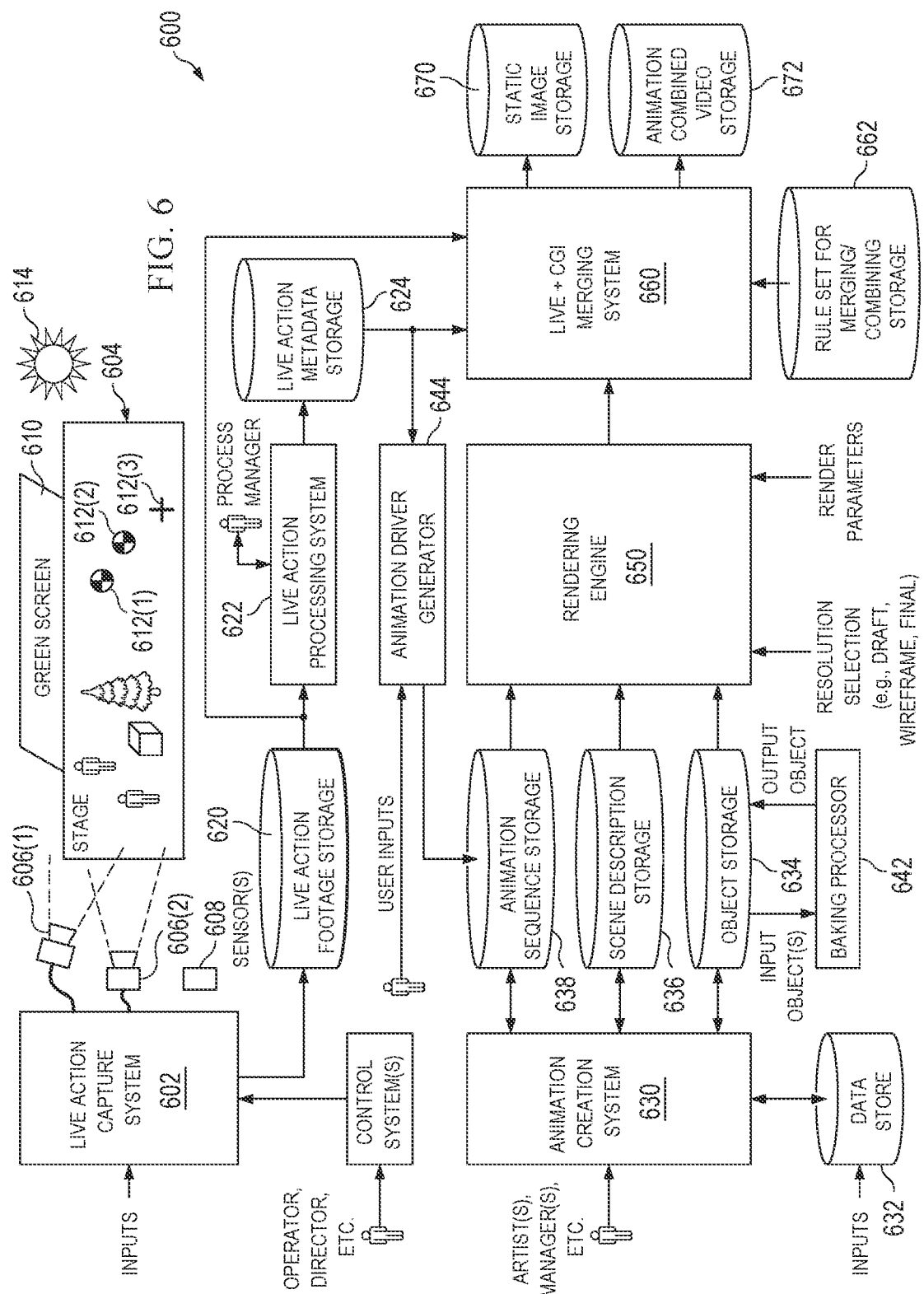
FIG. 6 illustrates an example visual content generation system as might be used to generate imagery in the form of still images and/or video sequences of images, according to various embodiments.

For example, FIG. 6 illustrates the example visual content generation system 600 as might be used to generate imagery in the form of still images and/or video sequences of images. Visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist, such as the roto artist animating 3D character rigs 112, 212, 312, and 312 using 2D rotoscoping images 102, 202, 302, and 302, and might use visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., the roto artist viewing environments, such as environments 100, 200, 300, and 400) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. Live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On stage 604, there might be human actors, animal actors, inanimate objects, background objects, and possibly an object such as a green screen 610 that is designed to be captured in a live scene recording in such a way that it is easily overlaid with computer-generated imagery. Stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, live action capture system 602 might output live action footage to a live action footage storage 620. A live action processing system 622 might process live action footage to generate data about that live action footage and store that data into a live action metadata storage 624. Live action processing system 622 might include computer processing capabilities, image processing capabilities, one or more processors, program code storage for storing program instructions executable by the one or more processors, as well as user input devices and user output devices, not all of which are shown. Live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 614, as that might be useful in post-processing to match computer-generated lighting on objects that are computer-generated and overlaid on the live action footage. Live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of visual content generation system 600. Animation creation system 630 might include computer processing capabilities, image processing capabilities, one or more processors, program code storage for storing program instructions executable by the one or more processors, as well as user input devices and user output devices, not all of which are shown. Animation creation system 630 might be used by animation artists, managers, and others to specify details, perhaps programmatically and/or interactively, of imagery to be generated. From user input and data from a database or other data source, indicated as a data store 632, animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 630 might be interactive, allowing a user to read in animation sequences, scene descriptions, object details, etc. and edit those, possibly returning them to storage to update or replace existing data. As an example, an operator might read in objects from object storage into a baking processor 642 that would transform those objects into simpler forms and return those to object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 632 might be used to drive object presentation. For example, if an artist is creating an animation of a spaceship passing over the surface of the Earth, instead of manually drawing or specifying a coastline, the artist might specify that animation creation system 630 is to read data from data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. Animation driver generator 644 might generate corresponding animation parameters to be stored in animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 622. Animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 650 might include computer processing capabilities, image processing capabilities, one or more processors, program code storage for storing program instructions executable by the one or more processors, as well as user input devices and user output devices, not all of which are shown.

Visual content generation system 600 can also include a merging system 660 that merges live footage with animated content. The live footage might be obtained and input by reading from live action footage storage 620 to obtain live action footage, by reading from live action metadata storage 624 to obtain details such as presumed segmentation in captured images segmenting objects in a live action scene from their background (perhaps aided by the fact that green screen 610 was part of the live action scene), and by obtaining CGI imagery from rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from rendering engine 650, and output an image where each pixel is a corresponding pixel from rendering engine 650 when the corresponding pixel in the live footage is a specific color of green, otherwise output a pixel value from the corresponding pixel in the live footage."

Merging system 660 might include computer processing capabilities, image processing capabilities, one or more processors, program code storage for storing program instructions executable by the one or more processors, as well as user input devices and user output devices, not all of which are shown. Merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of merging system 660, such as modifying boundaries of segmented objects, inserting blurs to smooth out imperfections, or adding other effects. Based on its inputs, merging system 660 can output an image to be stored in a static image storage 670 and/or a sequence of images in the form of video to be stored in an animated/combined video storage 672.

Thus, as described, visual content generation system 600 can be used to generate video that combines live action with computer-generated animation using various components and tools, some of which are described in more detail herein. While visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment includes a carrier medium carrying image data that includes depth information which is compressed using the method. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 7:
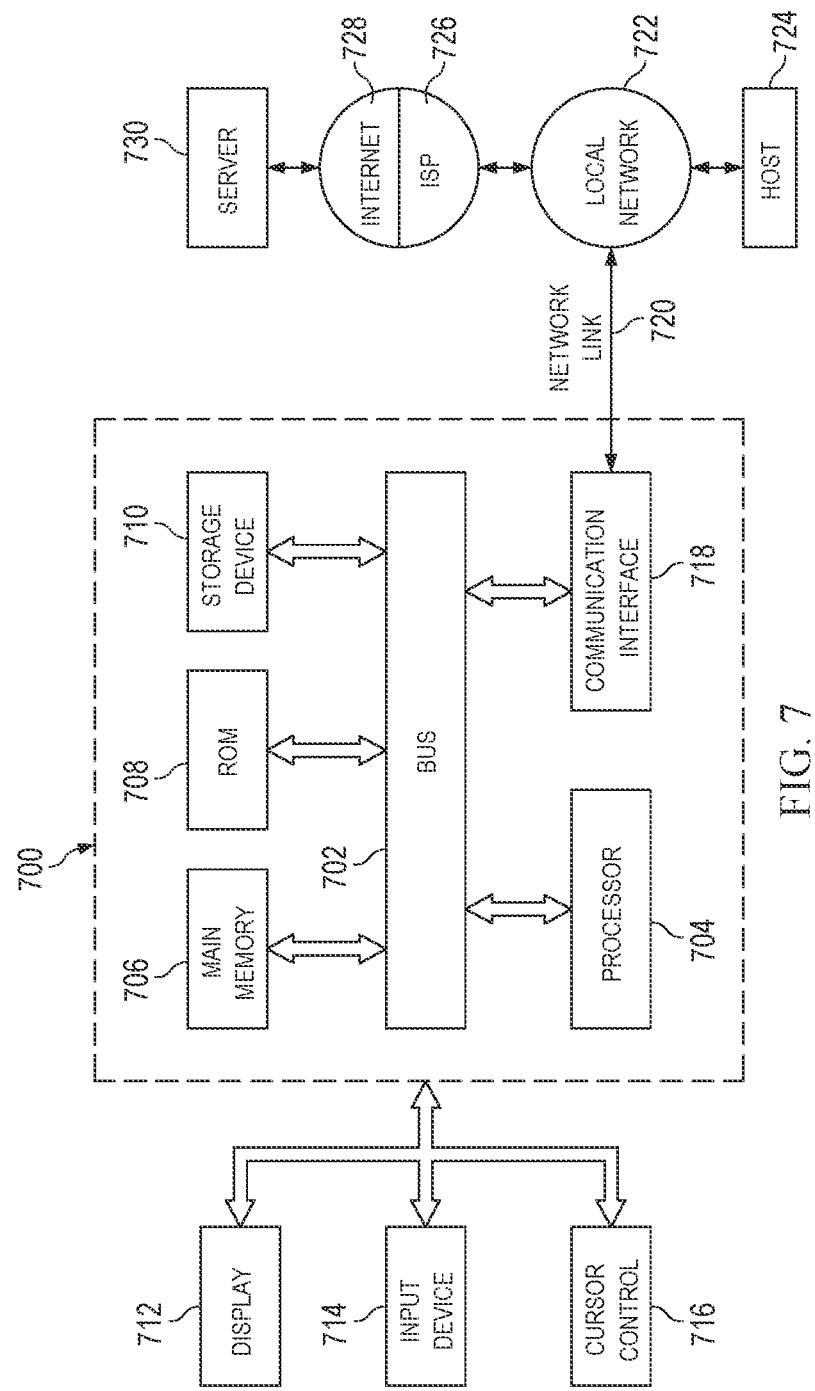
FIG. 7 is a block diagram illustrating an example computer system upon which computer systems of the systems illustrated in FIGS. 1 and 6 may be implemented.

For example, FIG. 7 is a block diagram that illustrates a computer system 700 upon which the computer systems of the systems described herein and/or visual content generation system 600 (see FIG. 6) may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for positioning a character rig in a user interface of a computing system, the method comprising:
under the control of one or more computer systems configured with executable instructions:
obtaining a computer-readable representation of the character rig, wherein the character rig is representable as a data structure of the character rig that specifies a plurality of articulated character parts, an element tree specifying relations between character parts of the plurality of articulated character parts, and a set of constraints on the character parts of the plurality of articulated character parts;
receiving rotoscoping placement input data, wherein the rotoscoping placement input data corresponds to attempted alignments of positions of at least some of the character parts with captured elements in a captured live action scene;
receiving rotoscoping constraints, wherein a rotoscoping constraint comprises at least a first constraint on the character rig other than a second constraint specified by the data structure of the character rig;
applying the rotoscoping constraints to a first set of character parts; and
positioning the character rig in a placement based on applying the rotoscoping constraints to the first set of character parts.

2. The computer-implemented method of claim 1, further comprising:
accepting rig movement inputs for a second set of character parts distinct from the first set of character parts, wherein the rig movement inputs represent the placement of character parts over the plurality of frames; and
moving the character rig over the plurality of frames according to the rig movement inputs, constrained by the rotoscoping constraints.

3. The computer-implemented method of claim 2, further comprising:
identifying a root node in the element tree, wherein the root node corresponds to a root character part in the first set of character parts;
identifying a set of lower branch nodes in the element tree, wherein the set of lower branch nodes corresponds to a branch character parts in the first set of character parts;
accepting subsequent rotoscoping movement input data; and
computing movements of the character rig based on the subsequent rotoscoping movement input data, wherein a node movement of a node of the set of lower branch nodes is made relative to a root node movement.

4. The computer-implemented method of claim 3, wherein the set of lower branch nodes comprises a set of nodes of the element tree that are other than the root node.

5. The computer-implemented method of claim 3, wherein identifying the root node comprises receiving input from a roto artist of a selection of a selected character part to be the root node.

6. The computer-implemented method of claim 2, wherein the data structure of the character rig includes mass data for the character parts, specifying particular masses assigned to at least some of the character parts, the method further comprising computing movements of the character parts based on force data representing simulated forces to be applied to the character parts and based on the particular masses.

7. The computer-implemented method of claim 1, wherein applying the rotoscoping constraints to the first set of character parts includes an alignment of a location on the character rig with a marker present in the captured live action scene.

8. The computer-implemented method of claim 1, wherein the captured live action scene is a human being, the plurality of articulated character parts corresponds to human body parts capable of moving relative to each other, and the set of constraints on the character parts correspond to constraints of human body movement.

9. The computer-implemented method of claim 1, wherein the captured live action scene comprises two-dimensional images and the character rig comprises rig elements movable in a three-dimensional virtual space.

10. The computer-implemented method of claim 1, wherein the captured live action scene comprises a plurality of video frames in a timed sequence.

11. The computer-implemented method of claim 1, wherein the rotoscoping placement input data represents the placement of character parts in a 3D scene space and/or the placement in a 2D or 3D image space.

12. A system comprising: at least one processor, and a storage medium storing instructions, which when executed by the at least one processor, cause the system to implement the computer-implemented method of claim 1.

13. A non-transitory computer-readable storage medium storing instructions, which when executed by at least one processor of a computer system, causes the computer system to carry out the computer-implemented method of claim 1.

14. A non-transitory computer-readable medium carrying instructions, which when executed by at least one processor of a computer system, causes the computer system to carry out the computer-implemented method of claim 1.

15. A computer system for positioning a character rig in a user interface, the computer system comprising:
at least one processor; and
a computer-readable medium storing instructions, which when executed by the at least one processor, causes the computer system to perform operations comprising:
obtaining the character rig, wherein the character rig is representable as a data structure specifying a plurality of articulated character parts, an element tree that specifies relations between character parts, and a set of constraints on the character parts;
receiving rotoscoping movement input data, wherein the rotoscoping placement input data corresponds to attempted alignments of at least some of the character parts with captured elements in a captured live action scene;
receiving rotoscoping constraints, wherein a rotoscoping constraint comprises at least a first constraint on the character rig other than a second constraint specified by the data structure of the character rig;
applying the rotoscoping constraints to a first set of character parts; and
positioning the character rig in a placement based on applying the rotoscoping constraints to the first set of character parts.

16. The computer system of claim 15, wherein the operations further comprise:
accepting rig movement inputs for a second set of character parts distinct from the first set of character parts; and moving the character rig according to the rig movement inputs, constrained by the rotoscoping constraints.

17. The computer system of claim 16, wherein the operations further comprise:
   identifying a root node in the element tree, wherein the root node corresponds to a root character part in the first set of character parts;
   identifying a set of lower branch nodes in the element tree, wherein the set of lower branch nodes corresponds to a branch character parts in the first set of character parts;
   accepting subsequent rotoscoping movement input data; and
   computing movements of the character rig based on the subsequent rotoscoping movement input data, wherein a node movement of a node of the set of lower branch nodes is made relative to a root node movement.

18. The computer system of claim 17, wherein the set of lower branch nodes comprises a set of nodes of the element tree that are other than the root node.

19. The computer system of claim 17, wherein identifying the root node comprises receiving input from a roto artist of a selection of a selected character part to be the root node.

20. The computer system of claim 15, wherein the data structure of the character rig includes mass data for the character parts, specifying particular masses assigned to at least some of the character parts, and wherein computing movements of the character parts is based on force data representing simulated forces to be applied to the character parts and based on the particular masses.

21. The computer system of claim 15, wherein applying the rotoscoping constraints to the first set of character parts includes an alignment of a location on the character rig with a marker present in the captured live action scene.

22. The computer system of claim 15, wherein the captured live action scene is a human being, the plurality of articulated character parts corresponds to human body parts capable of moving relative to each other, and the set of constraints on the character parts correspond to constraints of human body movement.

23. The computer system of claim 15, wherein the captured live action scene comprises two-dimensional images and the character rig comprises rig elements movable in a three-dimensional virtual space.

24. The computer system of claim 15, wherein the captured live action scene comprises a plurality of video frames in a timed sequence.

* * * * *